(12) United States Patent
Hreha et al.

(10) Patent No.: US 12,410,292 B1
(45) Date of Patent: *Sep. 9, 2025

(54) METHOD OF MAKING CARBONIZED COMPOSITES

(71) Applicant: Systima Technologies, Inc., Mukilteo, WA (US)

(72) Inventors: Richard D. Hreha, Centerville, OH (US); Kory K. Evanson, Vandalia, OH (US); Kristopher K. Aber, Dayton, OH (US); Jeffrey R. Josken, West Carrollton, OH (US); Michael D. Rauscher, Beavercreek, OH (US)

(73) Assignee: Systima Technologies, Inc., Mukilteo, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/662,498

(22) Filed: May 13, 2024

Related U.S. Application Data

(62) Division of application No. 17/405,454, filed on Aug. 18, 2021, now Pat. No. 12,006,411.

(Continued)

(51) Int. Cl.
*C08J 7/12* (2006.01)
*B29C 71/04* (2006.01)
(Continued)

(52) U.S. Cl.
CPC .............. *C08J 7/123* (2013.01); *B29C 71/04* (2013.01); *C08J 5/243* (2021.05); *C09K 5/14* (2013.01);
(Continued)

(58) Field of Classification Search
CPC ................... B29C 71/04; B32B 27/16; C08G 73/00–0677; C08J 79/00–04;
(Continued)

(56) References Cited

U.S. PATENT DOCUMENTS

| 440,438 A | 11/1890 | Robiscihjng |
| 3,945,999 A | 3/1976 | Gruffaz et al. |

(Continued)

FOREIGN PATENT DOCUMENTS

| CN | 104193706 B | 10/2015 |
| JP | 06271558 A | 9/1994 |
| WO | 0223962 A2 | 3/2002 |

OTHER PUBLICATIONS

Sandor, "PBI (Polybenzimidazole): Synthesis, Properties and Applications", High Performance Polymers, vol. 2, No. 1, pp. 25-37, 1990.

(Continued)

*Primary Examiner* — Kregg T Brooks
(74) *Attorney, Agent, or Firm* — DINSMORE & SHOHL LLP

(57) ABSTRACT

Methods of producing a fiber reinforced polymer matrix composite and a composite thermal protection system formed from the same. The method includes forming a polymerized fiber reinforced composite which including a cured thermoset polymer matrix and at least one reinforcement material. The method further includes treating at least a portion of a first face of the polymerized fiber reinforced composite with electromagnetic radiation to raise the temperature of the portion of the first face to at least 800° C. to produce a surface layer of graphitized carbon and a bulk polymerized fiber reinforced composite representing the untreated polymerized fiber reinforced composite. Further, the surface layer of graphitized carbon has an electrical conductivity of 0.25 S m$^{-1}$ to 2.5 S m$^{-1}$ where the electrical conductivity and a thermal conductivity are both greater than those of the bulk polymerized reinforced composite.

11 Claims, 5 Drawing Sheets

Related U.S. Application Data

(60) Provisional application No. 63/067,385, filed on Aug. 19, 2020.

(51) Int. Cl.
  *C08J 5/24* (2006.01)
  *C09K 5/14* (2006.01)
  *F16L 59/02* (2006.01)

(52) U.S. Cl.
  CPC ......... *F16L 59/028* (2013.01); *C08J 2363/00* (2013.01); *C08J 2379/00* (2013.01)

(58) Field of Classification Search
  CPC .. C08J 2379/00–04; C08J 5/243; C08J 7/123; C08J 7/18; H05K 3/105; C08L 79/00–04
  See application file for complete search history.

(56) References Cited

U.S. PATENT DOCUMENTS

| | | | |
|---|---|---|---|
| 4,017,451 A | 4/1977 | Ishida et al. | |
| 4,631,641 A * | 12/1986 | Brombal | H05K 9/0016 361/752 |
| 4,659,425 A | 4/1987 | Eggers et al. | |
| 7,878,214 B1 * | 2/2011 | Jansen | B64G 1/402 137/12 |
| 8,587,188 B1 | 11/2013 | Ingram et al. | |
| 10,370,508 B1 | 8/2019 | Hreha et al. | |
| 2006/0284539 A1 | 12/2006 | Sung | |
| 2014/0109719 A1 | 4/2014 | Lisseman et al. | |
| 2014/0242519 A1 | 8/2014 | Sagehashi et al. | |
| 2015/0376153 A1 | 12/2015 | Masuno et al. | |
| 2021/0395514 A1 | 12/2021 | Nakazumi et al. | |

OTHER PUBLICATIONS

Williams et al., "Thermal Protection Materials: Thermophysical Property Data", NASA Reference Publication 1289, 1992.
Brunovska et al., "Thermal Properties of Phthalonitrile Functional Polybenzoxazines", Thermochemica Acta Aug. 2000: 195-203.
Ogasawara et al., "Thermal Response and Ablation Characteristics of Carbon Fiber Reinforced Composite with Novel Silicon Containing Polymer MSP", Journal of Composite Materials, vol. 36, No. 2, pp. 143-157, 2002.
Abouel-Enein, "Polymeric and Sandwich Schiff's bases compleses derived from 4, 4'-Methylenedianiline", Journal of Thermal Analysis and Calorimetry, vol. 91, No. 3, pp. 929-936, 2008.
Ahmed et al., "Thermal insulation by heat resistant polymers for solid rocket motor insulation", Journal of Composite Materials 46(13) pp. 1549-1559, 2011.
Parkar et al., "Ablation characteristics of an aromatic thermosetting copolyester/carbon fiber composite", Journal of Composite Materials, 46(15), pp. 1819-1830, 2011.
Natali et al., "Ablative properties of carbon black and MWNT/phenolic composites: A comparative study", Composites: Part A 43, pp. 174-182, 2012.
Zhang et al., "Addition-curable phthalonitrile-functionalized novolac resin", High Performance Polymers, 24(5), pp. 398-404, 2012.
Zhizhko et al., "Oxo/Imido Heromethathesis Reactions Catalyzed by a Silica-Supported Tantalum Imido Complex", Organometallics 32, pp. 3611-3617, 2013.
Ali, "Palladium(II) and zinc(II) complexes of neutral [M2O2] donor Schiff bases derived from furfuraldehyde: Snythesis, characterization, fluorescence and corrosion inhibitors of ligands", Spectrochimica Acta Part A: Molecular and Biomolecular Spectroscopy 132, pp. 52-60, 2014.
De Almedia et al., "Processing and characterization of ablative composites used in rock motors", Journal of Reinforced Plastics & Composites, vol. 33(16) pp. 1474-1484, 2014.
NASA, "Game Changing Development Program, Potential Industry/NASA Partnership in the Development and Assessment of High Performance Thermal Protection System Materials", NNH15ZOA005L. Mar. 2, 2015. Nspires. Jul. 3, 2015.
Wen et al., "Synthesis and acidochromic, electrochromic properties of Schiff bases containing furan and triphenylamine units", Synthetic Metals 202, pp. 89-97, 2015.
Sabagh et al., "Thermochemical erosion and thermophysical properties of phenolic resin/carbon fiber/graphite nanocomposites", Journal of Reinforced Plastics & Composites, vol. 35(24), pp. 1814-1825, 2016.
Ransone et al., "Recent Advances in Carbon-Carbon Substrate Technology at Nasa Langley Research Center", https://ntrs.nasa.gov/search.jsp?R=19930003267, Feb. 4, 2019.

* cited by examiner

METHOD OF MAKING CARBONIZED COMPOSITES

CROSS-REFERENCE TO RELATED APPLICATIONS

This application is a divisional of U.S. patent application Ser. No. 17/405,454, filed Aug. 18, 2021, which claims priority to U.S. Provisional Application 63/067,385, filed Aug. 19, 2020, which is incorporated by reference herein in its entirety.

STATEMENT REGARDING FEDERALLY SPONSORED RESEARCH OR DEVELOPMENT

This invention was made with U.S. Government support under Contract No. HQ0147-17-C-7408 awarded by Missile Defense Agency to Cornerstone Research Group Inc. The U.S. Government has certain rights in the invention.

TECHNICAL FIELD

Embodiments of the present disclosure relate to methods of making fiber reinforced polymer matrix composite. More specifically, embodiments of the present disclosure relate to processing of thermosetting polymer composites to form selectively carbonized composites. The present disclosure further relates to composite thermal protection systems (TPS) utilizing the fiber reinforced polymer matrix composite.

BACKGROUND

Currently, there are no satisfactory techniques to impart high electrical conductivity and high thermal conductivity into conventionally processed continuous fiber reinforced polymer composites without adding material and weight. Current solutions include addition of conductive fillers into the polymer composite, which unavoidably increases the density of the resultant composite, can affect the mechanical performance of the composite, and also eliminates the possibility of using resin infusion-based processing techniques to make composites. Further solutions include addition of a metal mesh as an element of the composition, which allows for infusion processing techniques. However, the mesh also detrimentally adds weight, thus reducing the specific strength of the composite. Other conventional solutions employ post-processing techniques such as painting or secondary application of a conductive coating, which also detrimentally adds weight.

It will be further appreciated that the existing solutions rely on a polymer matrix to hold the conductive element to the composite and is highly susceptible to delamination at high temperatures, where the property of high thermal conductivity is desirable. Under very high heat fluxes, such as those experienced during reentry of spacecraft, it is desirable to have a high thermal conductivity layer to spread the heat away from stagnation points and disperse it to areas in cooler flow where it can be removed from the structure. The temperatures reached during such events typically exceed the thermal stability of the organic matrix polymer holding the mesh or conductive paint in place, thus leading to failure. In thermal protection system (TPS) applications such as this, typically carbon-carbon composites are used as opposed to organic polymer matrix composites, albeit by adding parasitic weight to the structure. However, carbon-carbon composite production for such articles requires multiple, time intensive processing steps and for the case of fabricating large structures, requires large and expensive furnaces, thus significantly increasing the production costs of such structures. The carbon-carbon composite produced for such application also lack the high specific strength of most aerospace grade organic matrix composites.

SUMMARY

As such, there is a need for making organic polymer matrix composites with high electrical conductivity and high thermal conductivity for high temperature applications. It is particularly advantageous to have a thermosetting polymer composite material that can simultaneously meet TPS specifications, provide structural contribution, and offer lightning strike and electromagnetic interference/electrostatic discharge (EMI/ESD) protection performance. The present embodiments address these needs by providing a method of producing a fiber reinforced polymer matrix composite with a surface layer of graphitized carbon, which provides increased thermal conductivity and electrical conductivity while retaining desirable structural properties.

Embodiments of the present disclosure relate to methods of producing a fiber reinforced polymer matrix composite. The methods include forming a polymerized fiber reinforced composite where the polymerized fiber reinforced composite includes a cured thermoset polymer matrix and at least one reinforcement material. The methods further include treating at least a portion of a first face of the polymerized fiber reinforced composite with electromagnetic radiation to raise the temperature of the portion of the first face to at least 800° C. to produce a surface layer of graphitized carbon on the first face of the polymerized fiber reinforced composite and a bulk polymerized fiber reinforced composite representing the polymerized fiber reinforced composite not treated with the electromagnetic radiation. Additionally, the surface layer of graphitized carbon includes an electrical conductivity of 0.25 S m$^{-1}$ to 2.5 S m$^{-1}$ and the surface layer of graphitized carbon includes a thermal conductivity that is greater than a thermal conductivity of the bulk polymerized reinforced composite.

Embodiments of the present disclosure additionally relate to a composite thermal protection system (TPS). The composite TPS includes a surface layer of graphitized carbon formed from treating at least a portion of a first face of a polymerized fiber reinforced composite comprising a cured thermoset polymer matrix and at least one reinforcement material with electromagnetic radiation to raise the temperature of the portion of the first face to at least 800° C. Further, formation of the surface layer of graphitized carbon directly from the polymerized fiber reinforced composite results in the surface layer of graphitized carbon being unified with a bulk polymerized fiber reinforced composite representing the polymerized fiber reinforced composite not treated with the electromagnetic radiation. Additionally, the surface layer of graphitized carbon includes an electrical conductivity of 0.25 S m$^{-1}$ to 2.5 S m$^{-1}$ and the surface layer of graphitized carbon includes a thermal conductivity that is greater than a thermal conductivity of the bulk polymerized reinforced composite.

Embodiments of the present disclosure additionally relate to a composite thermal protection system (TPS). The composite TPS includes a bulk polymerized fiber reinforced composite formed from a cured thermoset polymer matrix and at least one reinforcement material. The composite TPS further includes a surface layer of graphitized carbon unified with the bulk polymerized fiber reinforced composite. The bulk polymerized fiber reinforced composite and the surface layer of graphitized carbon form a monolith without an adhesive or fastener to secure the surface layer of graphitized carbon to the bulk polymerized fiber reinforced composite. Additionally, the surface layer of graphitized carbon has an electrical conductivity of 0.25 S m$^{-1}$ to 2.5 S m$^{-1}$ and the surface layer of graphitized carbon has a thermal conductivity that is greater than a thermal conductivity of the bulk polymerized reinforced composite.

BRIEF DESCRIPTION OF THE DRAWINGS

The following detailed description of specific embodiments of the present disclosure can be best understood when read in conjunction with the following drawings, in which.

Figure (FIG. 1 is a Scanning Electron Micrograph (SEM) of a cross-section of a fiber reinforced polymer matrix composite according to one or more embodiments of the present disclosure.

DETAILED DESCRIPTION

Figure 1:
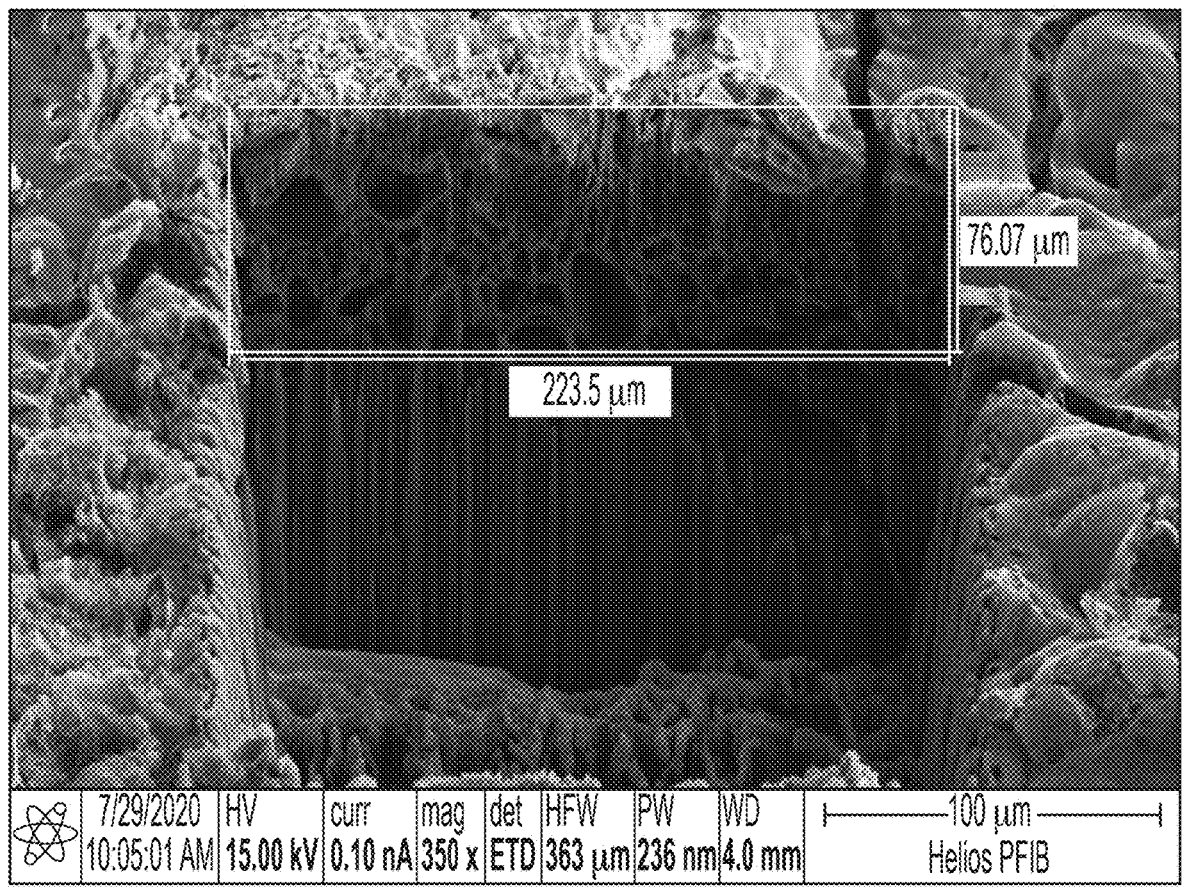

Embodiments of the present disclosure generally relate to fiber reinforced polymer matrix composite with selective carbonization and methods of producing the same. The fiber reinforced polymer matrix composite is be utilized in the formation of a composite thermal protection system (TPS) in one or more embodiments.

Generally, embodiments of the present disclosure provide material combinations and processes to produce a fiber reinforced polymer matrix composite having high surface electrical conductivity and high surface thermal conductivity, while retaining the high specific strength of a base thermoset polymer matrix composite (PMC). The a fiber reinforced polymer matrix composites with high surface electrical and high surface thermal conductivity are achieved through the utilization of selected thermosetting resins in combination with continuous reinforcements to form the PMC where the thermosetting resins are capable on exposure to electromagnetic radiation such as intense IR or laser heating of undergoing a carbonization process to produce a highly electrically and thermally conductive carbon matrix composite surface layer integral with the base thermoset polymer matrix composite. With such in-situ formed conductive layer being integral to the composite, the mechanical performance of the base thermoset polymer matrix composite is thus retained.

In accordance with embodiments of the method of producing a fiber reinforced polymer matrix composite, the method comprises selective carbonization of a thermoset polymer matrix composite (PMC). As such, the method initially comprises forming a polymerized fiber reinforced composite, the polymerized fiber reinforced composite comprising a cured thermoset polymer matrix and at least one reinforcement material which may alternative be referenced as a PMC. The method further comprises treating at least a portion of a first face of the polymerized fiber reinforced composite with electromagnetic radiation to raise the temperature of the portion of the first face to at least 800° C. to produce a surface layer of graphitized carbon on the first face of the polymerized fiber reinforced composite and a bulk polymerized fiber reinforced composite representing the polymerized fiber reinforced composite not treated with the electromagnetic radiation. The surface layer of graphitized carbon formed by treating the portion of the first face of the polymerized fiber reinforced composite with electromagnetic radiation comprises an electrical conductivity of 0.25 S m$^{-1}$ to 2.5 S m$^{-1}$. Further, the surface layer of graphitized carbon comprises a thermal conductivity that is greater than a thermal conductivity of the bulk polymerized reinforced composite.

The ability to impart electrical and thermal conductivities into thermoset polymer is desirable because thermoset polymers typically have superior thermal stability and mechanical properties when compared with thermoplastic polymers. Further, the fabrication processes available for making fiber reinforced polymer matrix composites are more versatile for thermoset polymers when comparing with thermoplastic polymers allowing for added enhancement of the performance of the polymer material. The performance enhancement benefits are even more pronounced when making parts that require superior structural performance and/or custom configurations, especially for large structures used in aerospace and/or space applications. Such structures generally require the use of high performance highly cross-linked thermoset polymers such as cyanate esters and bismaleimide. Once such high performance thermoset composite is fully cured, the material has such pronounced stability that there have traditionally been no reasonable methods to effectively modify the inherent properties of the thermoset polymer or impart multi-functionality, such as electrical and thermal conductivities, to it without adding new material. By selecting cured thermoset matrix composites with suitable chemistry and appropriate electromagnetic radiation exposure parameters in accordance with the present disclosure, thermally stable structural polymer matrix composites with integrated electrical and thermal conductivity can be produced that meet many challenges in the aerospace, hypersonic, and/or space applications, such as lightning strike protection and high temperature thermal protection.

Having generally described methods of method of producing a fiber reinforced polymer matrix composite, the specific steps, components, and process parameters will now be described in further detail.

Embodiments of the method of producing a fiber reinforced polymer matrix composite include forming a polymerized fiber reinforced composite where the polymerized fiber reinforced composite includes a cured thermoset polymer matrix and at least one reinforcement material. Polymerized fiber reinforced composites are generally known to those skilled in the art. However, as previously indicated, the specific thermoset polymer matrix selected to form the polymerized fiber reinforced composite has a profound and crucial effect on the capacity to generate the surface layer of graphitized carbon on the first face of the polymerized fiber reinforced composite.

In one or more embodiments, a thermoset polymer forming the cured thermoset polymer matrix comprises at least one polymer selected from a group consisting of phthalonitrile polymers, cross-linked polyimides, cyanate ester polymers, bismaleimide polymers, phenol-formaldehyde polymers forming from phenol-formaldehyde resins having a formaldehyde to phenol ratio greater than 1, and MG Resin polymers forming from MG Resins such as MG 23000 or MG 1843 manufactured by Cornerstone Research Group (Miamisburg, OH). In one or more specific embodiments, the thermoset polymer forming the cured thermoset polymer matrix comprises a MG Resin.

It is noted for purposes of that present disclosure that MG Resins are polymers represented by chemical formula (I) or (II) or (III)

may be chosen based on the desired application of use and properties desired for the bulk polymerized fiber reinforced composite. In some embodiments, the reinforcement material may be any of random carbon mats, carbon fiber scrims, chopped carbon fibers, carbon fiber knits, unidirectional carbon fiber plies, three-dimensional carbon fiber weaves, three-dimensional carbon fiber preforms, prepreg carbon fiber, or combinations thereof. Similarly, in some embodiments, the reinforcement material may be any of ceramic fiber scrims, chopped ceramic fibers, ceramic fiber knits, unidirectional ceramic fiber plies, three-dimensional ceramic fiber weaves, three-dimensional ceramic fiber preforms, prepreg ceramic fiber, or combinations thereof. Example ceramic fibers include silicon carbide fiber and basalt fiber. Additionally, the plain weave fabric or twill fabrics may be utilized in lieu of or in addition to one or both the carbon fiber or ceramic fiber as the reinforcement material.

The reinforcement material may be a unidirectional fibrous or a woven fabric material, and in some embodi-

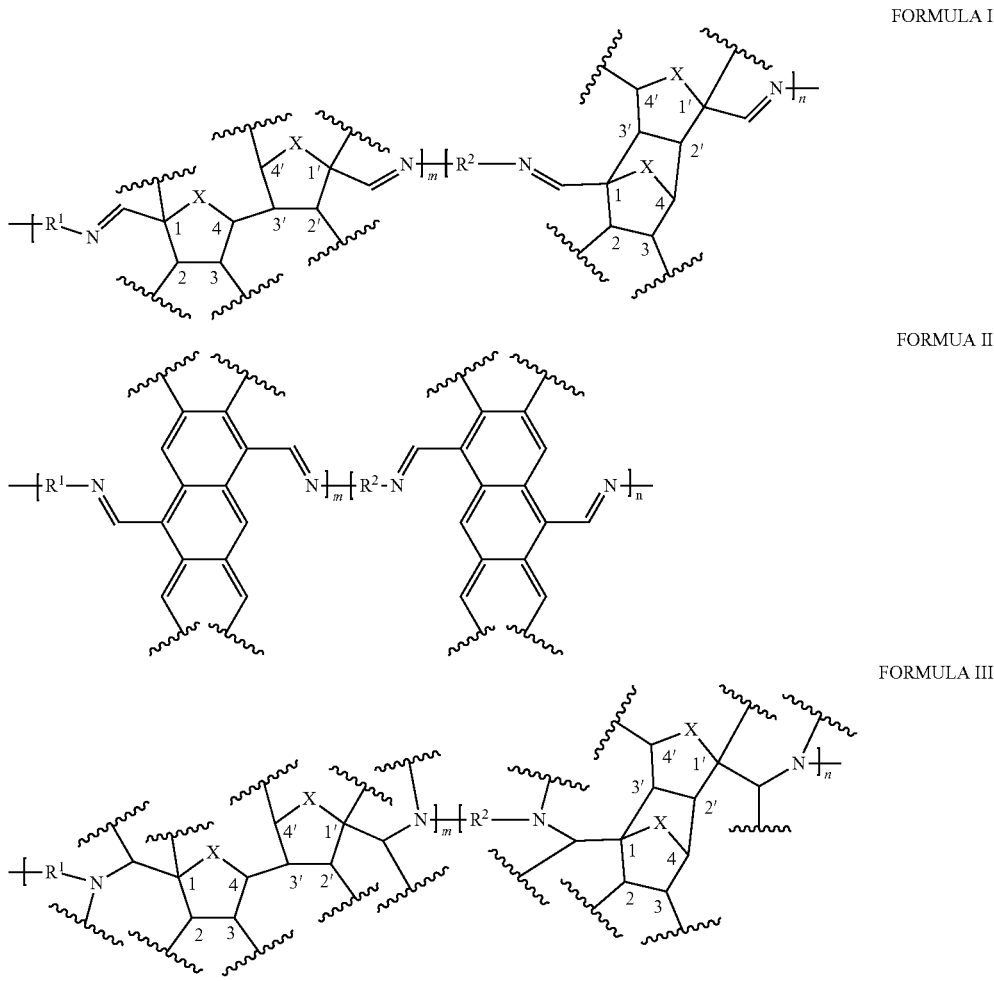

FORMULA I

FORMUA II

FORMULA III wherein: m and n are each an integer greater than or equal to 1, at least one of $R^1$ or $R^2$ comprises an aromatic moiety, and X is selected from the group consisting of $CH_2$, NH, O, S, $SO_2$, and combinations thereof.

In one or more embodiments, the reinforcement material is carbon fiber or ceramic fiber. The reinforcement material ments, may be arranged in a 0° and 90° or 0°, 45°, and 90° orientation between layers to provide structural support or may be in any other layup or laminate arrangements known in the industry. The reinforcement material may be in a braided, woven, plain weave, twill weave, satin weave, in a symmetric or non-symmetric laminate stack, in any other known configuration, or in any combination of configurations. Depending on the industrial application and the part thickness desired, it may be desirable to use multiple layers of the reinforcement material to form a layup. In some embodiments, the layup may comprise up to 300 layers of material, however, the present process is suitable for greater than 300 layers as well and is only limited by the desired final part dimensions and standard processing technique to form polymerized fiber reinforced composites.

The polymerized fiber reinforced composite may comprise the cured thermoset polymer matrix and the at least one reinforcement material in various ratios. In one or more embodiments, the polymerized fiber reinforced composite comprises 32 to 42 percent by weight of the carbon-based reinforcement material and 58 to 68 percent by weight of the cured thermoset polymer matrix. In further embodiments, the polymerized fiber reinforced composite comprises 35 to 40 percent by weight of the carbon-based reinforcement material and 60 to 65 percent by weight of the cured thermoset polymer matrix or the polymerized fiber reinforced composite comprises 37 to 38 percent by weight of the carbon-based reinforcement material and 62 to 63 percent by weight of the cured thermoset polymer matrix.

Embodiments of the method of producing a fiber reinforced polymer matrix composite include treating at least a portion of a first face of the polymerized fiber reinforced composite with electromagnetic radiation to raise the temperature of the portion of the first face to at least 800° C. In various embodiments, the electromagnetic radiation raises the temperature of the portion of the first face to 800° C. to 2800° C., 800° C. to 2500° C., 800° C. to 2200° C., 1000° C. to 2800° C., or 1200° C. to 2400° C.

In various embodiments, the electromagnetic radiation is in the form of ultraviolet (UV), visual (vis), or infrared light (IR). The ultraviolet spectrum covers 100 to 400 nm and is divided into three bands: UV-A (315 to 400 nm) UV-B (280 to 315 nm) UV-C (100 to 280 nm). The visual spectrum covers 400 to 700 nm. The infrared spectrum covers 700 nm to 1 mm and is divided into three bands: IR-A (700 nm-1.4 µm), IR-B (1.4-3 µm) and IR-C, also known as far-IR (3 µm–1 mm). It will be appreciated that near infrared (700 nm to 2.5 µm) provides desired efficiency in heating the composite. As the wavelength of the electromagnetic radiation shortens the incidence merely damaging the polymerized fiber reinforced composite instead of graphitized conversion increases. As the wavelength of the electromagnetic radiation approaches deep ultraviolet light, in the region of UV-C, the electromagnetic radiation may fail to convert the polymerized fiber reinforced composite and simply weaken or damage the polymerized fiber reinforced composite.

The power density of the electromagnetic radiation has an effect on the heating rate of the first face of the polymerized fiber reinforced composite. The power density is provides a measure of the radiant energy emitted in the form of the electromagnetic radiation to each unit area of the first face of the polymerized fiber reinforced composite per unit time. In one or more embodiments, the electromagnetic radiation is applied at a power density of 0.05 W/mm$^2$ to 0.75 W/mm$^2$. It will be appreciated that the units for power density (W/mm$^2$) may alternatively be presented as J/mm$^2$ per second as such represents energy per unit area per second. In various further embodiments, the electromagnetic radiation is applied at a power density of 0.05 W/mm$^2$ to 0.68 W/mm$^2$, 0.06 W/mm$^2$ to 0.75 W/mm$^2$, 0.07 W/mm$^2$ to 0.68 W/mm$^2$, or 0.078 W/mm$^2$ to 0.62 W/mm$^2$. It is noted that if the power density is too high, the electromagnetic radiation may ablate the surface of the polymerized fiber reinforced composite instead of creating a graphitized carbon layer integrated with the structure of the fiber reinforced polymer matrix composite. Conversely, if the power density is too low, the electromagnetic radiation may be provided at an insufficient rate to raise the temperature of the portion of the first face to at least 800° C. to generate the surface layer of graphitized carbon.

The total energy density of the electromagnetic radiation delivered to the first face of the polymerized fiber reinforced composite also has an effect on the depth of heating of the first face of the polymerized fiber reinforced composite. The total energy density is provides a measure of the radiant energy emitted in the form of the electromagnetic radiation to each unit area of the first face of the polymerized fiber reinforced composite. As such, a greater total energy density of the electromagnetic radiation delivered to the first face results in greater heating of the first face as well as greater depth penetration of the heating. In one or more embodiments, the electromagnetic radiation is applied at a total energy density of 0.5 J/mm$^2$ to 2.5 J/mm$^2$. In various further embodiments, the electromagnetic radiation is applied at a power density of 0.5 J/mm$^2$ to 2.3 J/mm$^2$, 0.55 J/mm$^2$ to 2.5 J/mm$^2$, 0.6 J/mm$^2$ to 2.5 J/mm$^2$, or 0.69 J/mm$^2$ to 2.3 J/mm$^2$. It is noted that if the total energy density is too low, the electromagnetic radiation may not convert enough material to the graphitized carbon to provide the desired conductivity performance. Conversely, if the total energy density is too high, the electromagnetic radiation may lead to overheating of the composite surface during treatment, resulting in delamination of the composite underneath the graphitized surface and a reduction in the desired structural properties of the fiber reinforced polymer matrix composite.

The total energy density of the electromagnetic radiation delivered to the first face of the polymerized fiber reinforced composite is a product of the power density of the electromagnetic radiation as well as the time each unit area of the first face is exposed to the electromagnetic radiation. The total time each unit area of the first face of the polymerized fiber reinforced composite is exposed to the power density is effected by rate the source of the electromagnetic radiation is scanning across the surface of the polymerized fiber reinforced composite (feed rate) and the number of times the electromagnetic radiation passes across the same unit area within a specific unit time. It will be appreciated that a faster feed rate generally results in lesser exposure time for a specific area in a single pass of the electromagnetic radiation beam and thus a lower total energy density within the single pass. However, in one or more embodiments, each raster or pass of the electromagnetic radiation source may overlap the previous raster or pass of the electromagnetic radiation source such that a unit area of the first face of the polymerized fiber reinforced composite receives multiple individual exposures to the electromagnetic radiation source.

In one or more embodiments, the electromagnetic radiation is produced from a laser. It will be appreciated that a laser represents a focused beam of electromagnetic radiation allowing the positioning of the treatment of the first face of the polymerized fiber reinforced composite with electromagnetic radiation to be defined. In one or more embodiments, the laser may produce electromagnetic radiation with a wavelength in the range from 690 to 1064 nm. Further example laser system include: for UV-vis (Argon laser 457 to 528 nm or Green laser 532 nm), for IR (diode laser 630-950 nm or Nd:YAG laser 1064 nm or Carbon dioxide laser 10600 nm).

In one or more embodiments, the electromagnetic radiation is generated with a plasma arc lamp. It will be appreciated that a plasma arc lamp represents a lamp that produces light by an electric arc passing across a gap between electrodes. In one or more embodiments, the plasma arc lamp may be operated at a power from 10,000 W to 25,000 W and a wavelength range from 200 to 1400 nm.

It will be appreciated that the electromagnetic radiation may be dispersed and of unequal intensity across the beam. For example, the beam from a laser may have intensity that is of a Gaussian distribution. The non-homogeneous beam intensity may result in striping of the polymerized fiber reinforced composite. To overcome this phenomenon the hatch overlap, which defines how much of the laser spot or beam overlaps between each raster, may be set at 90%, 80%, 70%, 60%, 50%, 40%, 30%, 20%, or 10% in various embodiments.

In accordance with embodiments of the method of producing a fiber reinforced polymer matrix composite the treatment with electromagnetic radiation produces a surface layer of graphitized carbon on the first face of the polymerized fiber reinforced composite. The graphitized carbon is a mixture of graphite, graphene and amorphous carbon. Using Raman Spectroscopy date, the graphitized carbon may be defined by the ratio of peak intensities of $I_D$ and $I_G$. $I_D$ represents the degree of disorderliness of graphene and $I_G$ represents the degree of orderliness of graphite domain. Specifically, the $I_G$ peak is a result of in-plane vibrations of sp2 bonded carbon atoms whereas the $I_D$ peak is due to out of plane vibrations attributed to the presence of structural defects. In accordance with one or more embodiments, the graphitized carbon possesses a ratio of $I_D/I_G$ between 1.2 and 2.28. It will be appreciated that the ratio for $I_D/I_G$ approaches 0 for a 100% graphite structure.

The surface layer of graphitized carbon comprises an electrical conductivity of 0.25 S m$^{-1}$ to 2.5 S m$^{-1}$. It will be appreciated that such electrical conductivity range represents a resistivity range of 0.4 to 4 ohms ((2). In various embodiments, the electrical conductivity of the surface layer of graphitized carbon represents an electrical conductivity that is at least eight order (108) of magnitude, seven order (107) of magnitude, six order (106) of magnitude, five order (105) of magnitude, or four order (104) of magnitude greater than an electrical conductivity of the bulk polymerized reinforced composite. As previously noted, the bulk polymerized fiber reinforced composite represents the polymerized fiber reinforced composite not treated with the electromagnetic radiation.

The electrical resistance and electrical conductivity of the surface layer of graphitized carbon on the first face of the polymerized fiber reinforced composite is a function of feed rate during exposure to the electromagnetic radiation as such effects the change in surface temperature and degree of conversion to graphitized carbon. As the feed rate becomes slower with a static power density of electromagnetic radiation the total energy density increases resulting in an increased surface temperature and a greater carbonization of the surface of the polymerized fiber reinforced composite. The greater carbonization leads to a decrease in resistance measured. Specifically, the degree of graphitization vs amorphous carbonization and depth of conversion to graphitized carbon changes as a function of the feed rate.

The surface layer of graphitized carbon comprises a thermal conductivity that is greater than a thermal conductivity of the bulk polymerized reinforced composite. In one or more embodiments, the method of claim 1, the thermal conductivity of the surface layer of graphitized carbon ranges from 25 W m$^{-1}$ K$^{-1}$ to 500 W m$^{-1}$ K$^{-1}$.

In one or more embodiments, a thickness of the surface layer of graphitized carbon ranges from 0.05 to 2 mm. In various further embodiments, the thickness of the surface layer of graphitized carbon ranges from 0.05 to 1 mm, 0.07 to 2 mm, 0.05 to 0.2 mm, or 0.07 to 1 mm. The thickness is measured as the region of the polymerized fiber reinforced composite which exhibits a carbonaceous conversion. The ranges for the thickness of the surface layer of graphitized carbon are the product of the specific power density and total energy density of the electromagnetic radiation exposure used in the process. The power density and the total energy density must be balanced to achieve a desired combination of thickness for thermal protection and degree of graphitization for conductivity. As previously indicated, if the power density or total energy density is too high, the electromagnetic radiation may ablate the surface of the polymerized fiber reinforced composite instead of creating a graphitized carbon layer integrated with the structure of the fiber reinforced polymer matrix composite. Further, if the power density or total energy density is too high, the electromagnetic radiation may overheat the surface leading to delamination of composite underneath. Similarly, if the total energy density is too low, the electromagnetic radiation may not convert enough material to the graphitized carbon to provide the desired conductivity performance.

It is noted that in one or more embodiments the degree of graphitization is gradated through the thickness of the surface layer, due to absorption at the surface of the polymerized fiber reinforced composite. Specifically, the degree of conversion to graphitized carbon is reduced as the distance from the surface of the polymerized fiber reinforced composite increases. As such, the electrical and thermal conductivity is also reduced as the distance from the surface of the polymerized fiber reinforced composite increases until reaching the bulk polymerized fiber reinforced composite.

The direct conversion of the polymerized fiber reinforced composite to generate the surface layer of graphitized carbon means the surface layer of graphitized carbon is unified with the bulk polymerized fiber reinforced composite. For the purposes of the present disclosure, the term "unified" means the bulk polymerized fiber reinforced composite and the surface layer of graphitized carbon form a monolith without an adhesive or fastener being used to secure the surface layer of graphitized carbon to the bulk polymerized fiber reinforced composite. Specifically, the surface layer of graphitized carbon and the bulk polymerized fiber reinforced composite are joined at the atomic level as the surface layer of graphitized carbon is converted material from the polymerized fiber reinforced composite and not a separate layer affixed to the bulk polymerized fiber reinforced composite. In fact, there is not specific demarcation of a line between the bulk polymerized fiber reinforced composite and the surface layer of graphitized carbon as the degree of graphitization is gradated through the thickness of the surface layer until a point of is reached where the polymerized fiber reinforced composite is unaffected by the electromagnetic radiation.

With reference to FIG. 1, the surface layer and the bulk polymerized fiber reinforced composite may be distinguished with a region therebetween where a transition from graphitized carbon to unaffected polymerized fiber reinforced composite occurs.

The method of producing a fiber reinforced polymer matrix composite utilizing electromagnetic radiation to produce a surface layer of graphitized carbon on a polymerized fiber reinforced composite allows for the surface layer of graphitized carbon to be selectively placed. Specifically, by adjusting the locations of the polymerized fiber reinforced composite exposed to the electromagnetic radiation allows for the graphitized carbon to only be generated in specific locations. This is in contravention to other techniques to carbonize fiber reinforced composites where heat is universally applied, such as in an autoclave, resulting in unrestricted carbonization of the fiber reinforced composite. As only one or selected faces or areas of a fiber reinforced composite part may desirously be carbonized for specific applications, the methods of the present disclosure provide a useful and novel advancement in the generation of fiber reinforced composite parts.

In one or more embodiments, at least 90% of the first face of the polymerized fiber reinforced composite is treated with the electromagnetic radiation such that the surface layer of graphitized carbon extends across at least 90% of the first face of the polymerized fiber reinforced composite. Specifically, the electromagnetic radiation may be applied to the first face of the polymerized fiber reinforced composite in a generally universal manner so a substantial portion of the first face is converted to graphitized carbon. In further embodiments, at least 92%, at least 94%, at least 96%, at least 99%, or substantially 100% of the first face of the polymerized fiber reinforced composite is treated with the electromagnetic radiation.

Figure 2A:
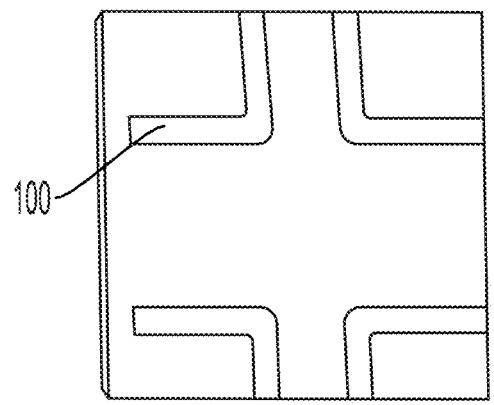
FIGS. 2A through 2C are schematic illustrations of defined patterns generated by the electromagnetic radiation forming electrically and thermally conductive traces according to one or more embodiments of the present disclosure.
Figure 2B:
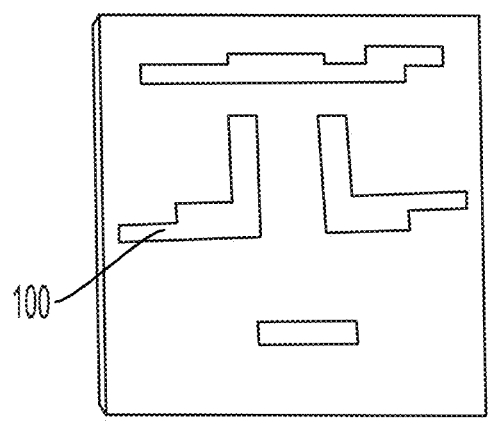
Figure 2C:
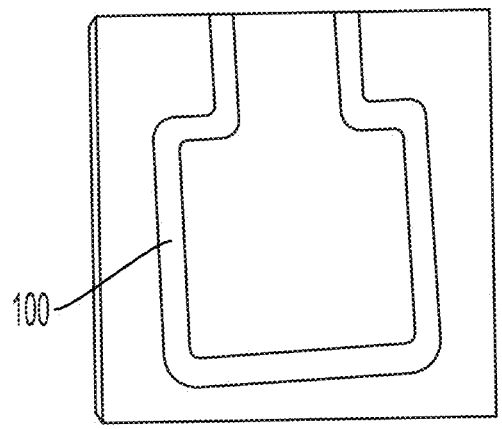

In one or more embodiments, the first face of the polymerized fiber reinforced composite is treated with the electromagnetic radiation in a defined pattern such that electrically and thermally conductive traces form the surface layer of graphitized carbon. With reference to FIG. 2, examples of layouts of the conductive traces 100 are shown. In one or more embodiments, the electrically and thermally conductive traces 100 cover less than 50% of the area of the first face of the polymerized fiber reinforced composite. In various further embodiments, the electrically and thermally conductive traces 100 cover less than 80%, less than 70%, less than 60%, less than 40%, less than 30%, less than 20%, or less than 10% of the area of the first face of the polymerized fiber reinforced composite. Generation of well-defined conductive pattern in the form of the conductive traces 100 on an otherwise substantially non-conductive surface of a polymerized fiber reinforced composite provided utility in enabling functions such as lightning strike protection or conformal antenna apertures as an integral function of the fiber reinforced polymer matrix composite.

Having described the method of producing a fiber reinforced polymer matrix composite, the benefits of such process and the advantages of the produced fiber reinforced polymer matrix composite over current composites become apparent. The unique structure of the fiber reinforced polymer matrix composite able to be generated through the advancements of the presently disclosed method provides enhanced ablation resistance as well thermal protection/insulation compared to conventional polymerized fiber reinforced composites as demonstrated by the Examples provided infra.

Embodiments of the method of producing a fiber reinforced polymer matrix composite generate material of enhanced utility for use in thermal protection systems for various structures. In one or more embodiments, a composite thermal protection system (TPS) comprises a bulk polymerized fiber reinforced composite and a surface layer of graphitized carbon unified with the bulk polymerized fiber reinforced composite. The bulk polymerized fiber reinforced composite comprises a cured thermoset polymer matrix and at least one reinforcement material. Further, the bulk polymerized fiber reinforced composite and the surface layer of graphitized carbon form a monolith without an adhesive or fastener to secure the surface layer of graphitized carbon to the bulk polymerized fiber reinforced composite. Additionally, the surface layer of graphitized carbon comprises an electrical conductivity of 0.25 S m$^{-1}$ to 2.5 S m$^{-1}$ and the surface layer of graphitized carbon comprises a thermal conductivity that is greater than a thermal conductivity of the bulk polymerized reinforced composite.

In one or more embodiments, a composite thermal protection system (TPS) comprises a surface layer of graphitized carbon formed from treating at least a portion of a first face of a polymerized fiber reinforced composite comprising a cured thermoset polymer matrix and at least one reinforcement material with electromagnetic radiation to raise the temperature of the portion of the first face to at least 800° C. Formation of the surface layer of graphitized carbon directly from the polymerized fiber reinforced composite results in the surface layer of graphitized carbon being unified with a bulk polymerized fiber reinforced composite representing the polymerized fiber reinforced composite not treated with the electromagnetic radiation. Additionally, the surface layer of graphitized carbon comprises an electrical conductivity of 0.25 S m$^{-1}$ to 2.5 S m$^{-1}$ and the surface layer of graphitized carbon comprises a thermal conductivity that is greater than a thermal conductivity of the bulk polymerized reinforced composite.

In one or more embodiments, the thermal protection system is applied to a hypersonic vehicle.

In one or more embodiments, the thermal protection system is utilized in a lightning strike protection, radar absorbing, deicing, or EMI shielding application.

In order that the previously described embodiments may be more easily understood, reference is made to the following examples that illustrate one or more features of the present disclosure. The examples are not intended to be limiting in scope and instead are merely selected illustrations of a subset of the full range of the present disclosure.

Inventive Example 1

A fiber reinforced polymer matrix composite was made in accordance with the methods of the present disclosure. As such, thermosetting polymer composite samples were treated with electromagnetic radiation induced carbonization and graphitization under an inert Argon environment. Specifically, blocks of a cured MG 23000 resin (Cornerstone Research Group, Inc., Miamisburg, OH) reinforced with Thornel T650 carbon fiber (Solvay, Brussels, Belgium) were prepared with 35 weight percent resin and treated with a Nd:Yag laser. The Nd:Yag laser generated a 350 W beam of 1064 nm wavelength and a beam width of 8 mm. The hatch overlap, which defines how much of the laser beam overlaps between each raster was set at 80%. Samples were treated with feed rates ranging from 60 mm/s to 500 mm/s, with laser beam raster across the part either in parallel or in the 90° direction. The feed rates of 60 mm/s to 500 mm/s resulted in surface temperatures at the laser exposed area between approximately 700° C. and 2800° C., depending on the feed rate of the laser. These generated samples are referenced as Inventive Example 1 ("feed rate in mm/s"). For example, samples treated with a feed rate of 150 mm/s in particular are labeled as Inventive Example 1 (150).

Figure 3:
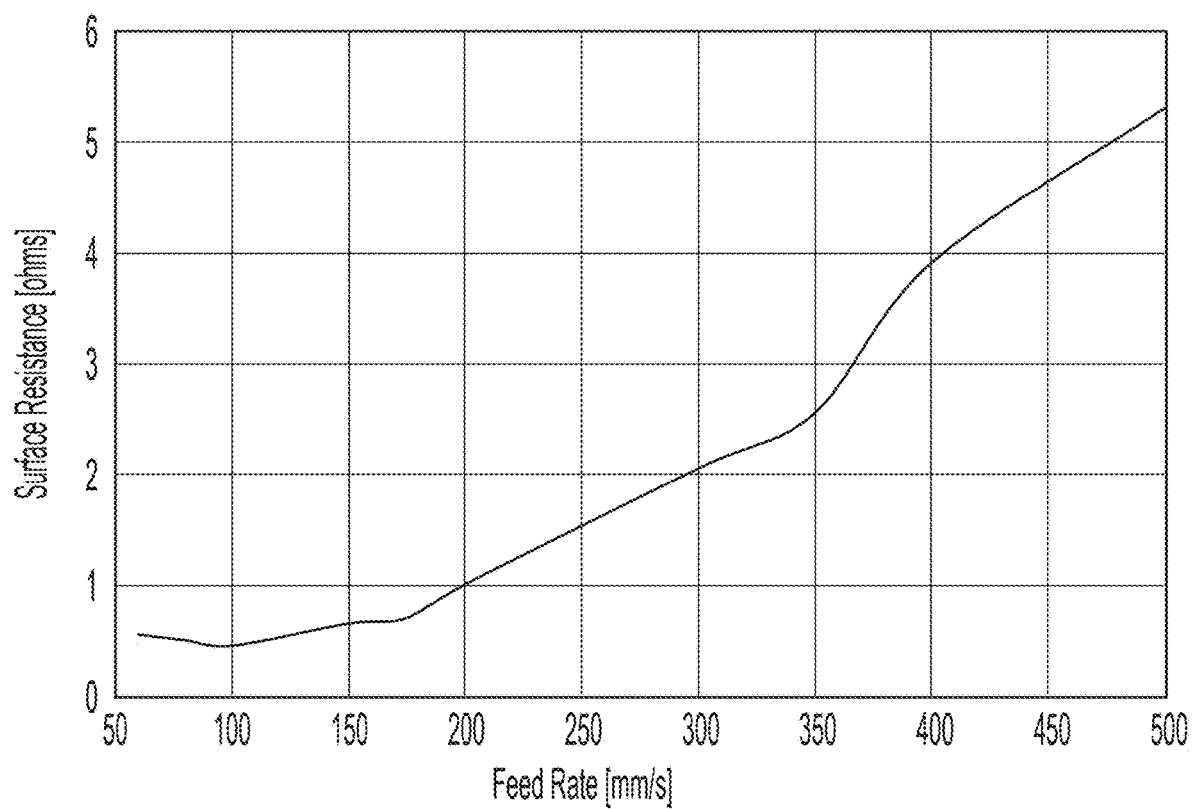
FIG. 3 is a graph illustrating the effect of feed rate past the electromagnetic radiation on surface resistivity for a fiber reinforced polymer matrix composite generated in accordance with one or more embodiments of the present disclosure.

With reference to FIG. 3, the resistance of the surface layer of graphitized carbon of the fiber reinforced polymer matrix composite generated with different feed rates is illustrated. Such graphical representation of the surface resistance illustrates the decreasing resistance (increasing conductivity) as the feed rate is slowed. The slower feed rate is commensurate with higher surface temperatures at the laser exposed area when compared to a faster feed rate which results in greater graphitization of the surface layer. For example, a feed rate of 150 mm/s results in a surface resistance of less than 1Ω compared to a resistance of greater than 500,000,000Ω (500 MΩ) for the untreated thermosetting polymer composite samples.

Comparative Example 2

For comparison, the thermosetting polymer composite samples utilized in Inventive Example 1 were left untreated to generate Comparative Example 2. Specifically, composite samples of cured MG 3000 resin reinforced with T650 carbon fiber were generated and utilized without further processing.

Comparative Example 3

For additional comparison, the thermosetting polymer composite samples utilized in Inventive Example 1 were fully carbonized to a carbon-carbon composite to generate Comparative Example 3. Specifically, composite samples of cured MG 23000 resin reinforced with T650 carbon fiber were generated and heated to 900° C. in an oven or furnace for 2 hours to completely carbonize the MG 23000 resin and generate a carbon-carbon composite. The carbon-carbon composite was further densified through 4 densification cycles with MG 3000 resin with heat treatment up to 1650° C. in an Argon atmosphere.

Figure 4:
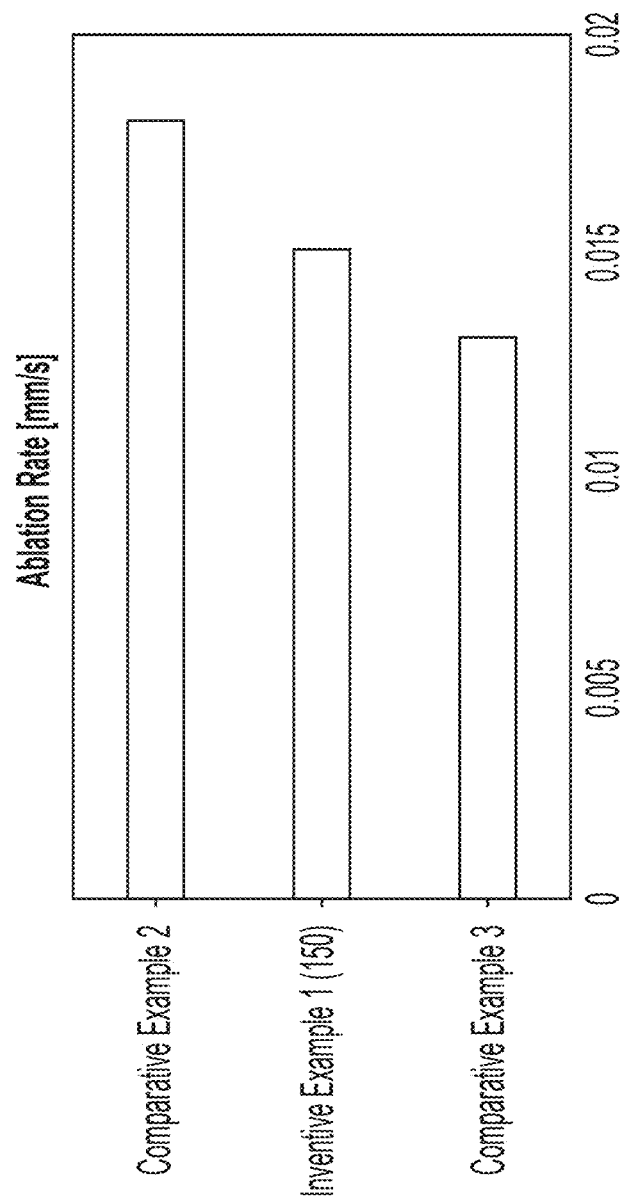
FIG. 4 is a graph comparing ablation rates of untreated thermoset polymer matrix composite, fully carbonized polymer matrix composite, and fiber reinforced polymer matrix composite treated with electromagnetic radiation according to one or more embodiments of the present disclosure.

To demonstrate the performance of fiber reinforced polymer matrix composites generated in accordance with the present disclosure and their enhanced performance as a thermal protection system ablation testing was completed. With reference to FIG. 4, a comparison of the ablation resistance of Inventive Example 1 (150), Comparative Example 2, and Comparative Example 3 is illustrated. It can be seen from the graphical illustration of FIG. 4 that the ablation rate of Inventive Example 1 (150) is significantly lower than Comparative Example 2 (untreated composite), and is approaching the ablation rate of Comparative Example 3 (carbon-carbon composite). It is noted that a fully carbonized carbon-carbon composite, such as Comparative Example 3, is currently the state-of-art material for thermal protection system, but the use of it requires adding parasitic weight to the thermal protection system and as demonstrated by the additional testing provided infra lacks in other performance metrics.

Accordingly, in accordance with one or more embodiments, a thermal protection system utilizing the fiber reinforced polymer matrix composite of the present disclosure comprises a thermal ablation rate greater than 10% less than a thermal ablation rate of the polymerized fiber reinforced composite in an untreated form.

Figure 5:
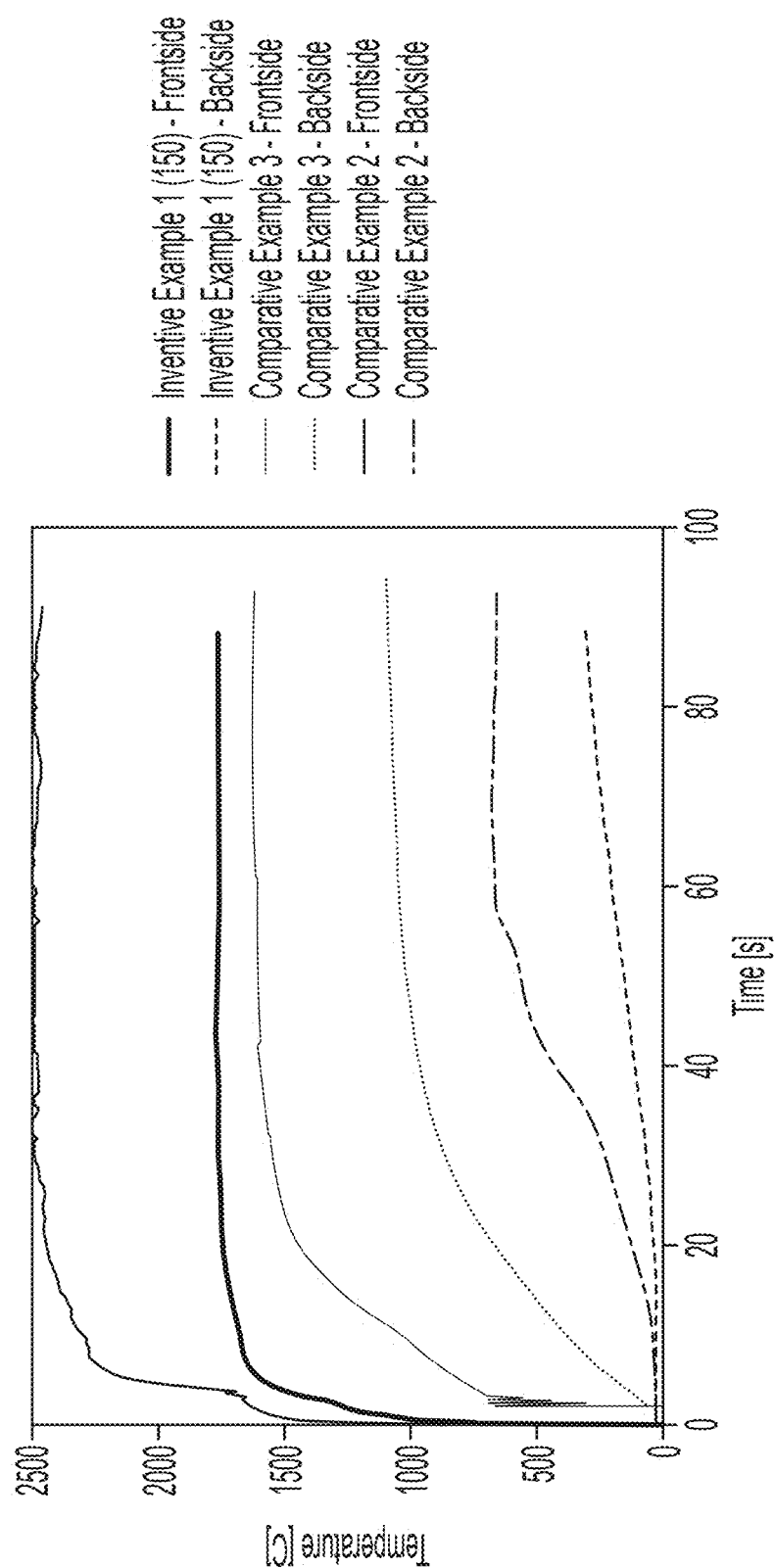
FIG. 5 is a graph comparing front side and backside temperatures when exposed to a front side heat flux of 200 W/cm$^3$ of matching samples of untreated thermoset polymer matrix composite, fully carbonized polymer matrix composite, and fiber reinforced polymer matrix composite treated with electromagnetic radiation according to one or more embodiments of the present disclosure.

To demonstrate the performance of fiber reinforced polymer matrix composites generated in accordance with the present disclosure, their enhanced performance as a thermal protection system in a thermal shielding test was completed. With reference to FIG. 5, a comparison of the thermal shielding of Inventive Example 1 (150), Comparative Example 2, and Comparative Example 3 is illustrated. Specifically, a comparison of temperature at both the front surface and the back surface vs time of samples being exposed to controlled heat fluxes at 200 W/cm$^2$ across the front surface of each sample is provided. It can be seen that Inventive Example 1 (150) has a significantly lower plateau temperature at the front side during heat exposure comparted to Comparative Example 2 (untreated composite), but slightly higher than that of Comparative Example 3 (carbon-carbon composite). This indicates effective heat dissipation at the surface exposed to heat flux for the Inventive Example 1 (150) approaching fully carbonized composite material. However, comparison of back side temperatures highlights the impressive performance of the Inventive Example 1 (150). Specifically, when comparing the back side temperatures of the three materials, Inventive Example 1 (150) has a plateau temperature lower than both Comparative Example 2 and Comparative Example 3. This indicates that Inventive Example 1 (150) performs effectively as a heat shield or thermally insulative material for the back side.

Accordingly, in accordance with one or more embodiments, a measured temperature of a second side of a thermal protection system utilizing the fiber reinforced polymer matrix composite of the present disclosure (composite TPS) is greater than 50% less than a measured temperature of a second side of a sample of the polymerized fiber reinforced composite in an untreated form having the same dimensions as the composite TPS after 60 second of thermally exposure to a front side of the composite TPS and a front side of the sample, wherein the front side of the composite TPS is opposite the backside of the composite TPS and the front side of the sample is opposite the backside of the sample.

The performance of Inventive Example 1 (150) overall is desirable as in an effective thermal protection system as it is important to reduce the front side temperature to reduce the degree of thermal ablation while concurrently reducing the back side temperature to shield the internal structure or system that the thermal protection system deployed to protect. Thus, the combined results of testing illustrated in FIG. 4 and FIG. 5 demonstrate that Inventive Example 1 (150) formed in accordance with the present disclosure results in a hybrid or gradient composite that meets the desired performance of a TPS.

Inventive Example 4

A fiber reinforced polymer matrix composite was made in accordance with the methods of the present disclosure. As such, thermosetting polymer composite samples were treated with electromagnetic radiation induced carbonization and graphitization under an inert Argon environment. Specifically, composite coupons containing 35 weight percent cured MG 1843 resin (Cornerstone Research Group, Inc., Miamisburg, OH) reinforced with Thornel T650 carbon fiber (Solvay, Brussels, Belgium) were treated with a Nd:Yag laser. The Nd:Yag laser generated a 300 W or 350 W beam of 1064 nm wavelength and a beam width of 8 mm in various prepared examples. The hatch overlap between each raster was set at 80%. Samples were treated with feed rates ranging from 100 mm/s to 300 mm/s, with laser beam raster across the part either one treatment in parallel or two treatments consisting of one in the parallel direction and one in the 90° direction. These generated samples are referenced as Inventive Example 4 ("feed rate in mm/s"/"laser power"). For example, samples treated with a feed rate of 150 mm/s and a laser power of 350 W in particular are labeled as Inventive Example 4 (150/350 W).

Mechanical testing was also performed to demonstrate that the process of treating with the electromagnetic radiation did not significantly impact the mechanical properties of the resulting composite material. Specifically, a series of mechanical tests were completed at room temperature using ASTM D638, ASTM D695, and ASTM D3846 for tensile, compression, and interlaminar properties respectively. The resulting mechanical properties of Inventive Example 4 compared to Comparative Example 2 (untreated) are provided in Table 1. A review of Table 1 reveals that the mechanical properties of Inventive Example 4 are substantially aligned with Comparative Example 2 (untreated). When combining these performance characteristics with the thermal protection characteristic, it demonstrated that the fiber reinforced polymer matrix composite generated in accordance with the present disclosure (Inventive Example 4) has great potential to be used directly as a structural TPS without the drawback of adding parasitic weight to achieve desired thermal performance characteristics as required other currently available TPS materials.

TABLE 1

Mechanical Properties

| | Average Tensile Strength (ksi) | Average Tensile Modulus (ksi) | Average Strain to Failure (%) | Average Compression Strength (ksi) | Average Compression Modulus (Msi) | Average Interlaminar Shear Strength (ksi) |
|---|---|---|---|---|---|---|
| Comparative Example 2 | 41.04 | 8.02 | 0.56 | 25.39 | 7.98 | 2.76 |
| Inventive Example 4 (150/350 W) | 40.55 | 8.11 | 0.54 | 22.44 | 7.85 | 2.25 |
| Inventive Example 4 (100/300 W) | 39.95 | 7.95 | 0.55 | 22.65 | 8.01 | 2.24 |
| Inventive Example 4 (300/300 W) | 41.58 | 7.93 | 0.58 | 23.36 | 8.14 | 2.22 |

Having described various embodiments, it should be understood that the various aspects of the method of producing a fiber reinforced polymer matrix composite and composite thermal protection systems (TPS) implementing the same may be utilized in conjunction with various other aspects.

In a first aspect, the disclosure provides a method of producing a fiber reinforced polymer matrix composite. The method includes forming a polymerized fiber reinforced composite, the polymerized fiber reinforced composite comprising a cured thermoset polymer matrix and at least one reinforcement material; and treating at least a portion of a first face of the polymerized fiber reinforced composite with electromagnetic radiation to raise the temperature of the portion of the first face to at least 800° C. to produce a surface layer of graphitized carbon on the first face of the polymerized fiber reinforced composite and a bulk polymerized fiber reinforced composite representing the polymerized fiber reinforced composite not treated with the electromagnetic radiation, wherein the surface layer of graphitized carbon comprises an electrical conductivity of 0.25 S m$^{-1}$ to 2.5 S m$^{-1}$; and wherein the surface layer of graphitized carbon comprises a thermal conductivity that is greater than a thermal conductivity of the bulk polymerized reinforced composite.

In a second aspect, the disclosure provides the method of the first aspect, in which the electromagnetic radiation is applied at a power density of 0.05 W/mm$^2$ to 0.75 W/mm$^2$ and delivered at a total energy density to the first face of 0.5 J/mm$^2$ to 2.5 J/mm$^2$.

In a third aspect, the disclosure provides the method of the first or second aspect, in which a thermoset polymer forming the cured thermoset polymer matrix comprises at least one polymer selected from a group consisting of phthalonitrile polymers, cross-linked polyimide polymers, cyanate ester polymers, bismaleimide polymers, MG Resin polymers, and phenol-formaldehyde polymers forming from phenol-formaldehyde resins having a formaldehyde to phenol ratio greater than 1.

In a fourth aspect, the disclosure provides the method of any of the first through third aspects, in which the thermoset polymer forming the cured thermoset polymer matrix comprises a MG Resin.

In a fifth aspect, the disclosure provides the method of any of the first through fourth aspects, in which the reinforcement material is carbon fiber or ceramic fiber.

In a sixth aspect, the disclosure provides the method of any of the first through fifth aspects, in which the electromagnetic radiation is produced from a laser with a wavelength range from 690 to 1064 nm.

In a seventh aspect, the disclosure provides the method of any of the first through fifth aspects, in which the electromagnetic radiation is generated with a plasma arc lamp operating at a power range from 10,000 W to 25,000 W and a wavelength range from 200 to 1400 nm.

In an eighth aspect, the disclosure provides the method of any of the first through seventh aspects, in which the thermal conductivity of the surface layer of graphitized carbon ranges from 25-500 W m$^{-1}$ K$^{-1}$.

In a ninth aspect, the disclosure provides the method of any of the first through eighth aspects, in which a thickness of the surface layer of graphitized carbon ranges from 0.05 to 2 mm.

In a tenth aspect, the disclosure provides the method of any of the first through ninth aspects, in which at least 90% of the first face of the polymerized fiber reinforced composite is treated with the electromagnetic radiation such that the surface layer of graphitized carbon extends across at least 90% of the first face of the polymerized fiber reinforced composite.

In an eleventh aspect, the disclosure provides the method of any of the first through ninth aspects, in which the first face of the polymerized fiber reinforced composite is treated with the electromagnetic radiation in a defined pattern such that electrically and thermally conductive traces form the surface layer of graphitized carbon.

In a twelfth aspect, the disclosure provides the method of the eleventh aspect, in which the electrically and thermally conductive traces cover less than 50% of the area of the first face of the polymerized fiber reinforced composite.

In a thirteenth aspect, the disclosure provides a composite thermal protection system (TPS). The composite TPS comprises a surface layer of graphitized carbon formed from treating at least a portion of a first face of a polymerized fiber reinforced composite comprising a cured thermoset polymer matrix and at least one reinforcement material with electromagnetic radiation to raise the temperature of the portion of the first face to at least 800° C., wherein formation of the surface layer of graphitized carbon directly from the polymerized fiber reinforced composite results in the surface layer of graphitized carbon being unified with a bulk polymerized fiber reinforced composite representing the polymerized fiber reinforced composite not treated with the electromagnetic radiation; wherein the surface layer of graphitized carbon comprises an electrical conductivity of 0.25 S m$^{-1}$ to 2.5 S m$^{-1}$; and wherein the surface layer of graphitized carbon comprises a thermal conductivity that is greater than a thermal conductivity of the bulk polymerized reinforced composite.

In a fourteenth aspect, the disclosure provides the TPS system of the thirteenth aspect, in which a thermoset polymer forming the cured thermoset polymer matrix comprises at least one polymer selected from a group consisting of phthalonitrile polymers, cross-linked polyimide polymers, cyanate ester polymers, bismaleimide polymers, MG Resin polymers, and phenol-formaldehyde polymers forming from phenol-formaldehyde resins having a formaldehyde to phenol ratio greater than 1.

In a fifteenth aspect, the disclosure provides the TPS system of the thirteenth or fourteenth aspect, in which the reinforcement material is carbon fiber or ceramic fiber.

In a sixteenth aspect, the disclosure provides the TPS system of any of the thirteenth through fifteenth aspects, in which a thickness of the surface layer of graphitized carbon ranges from 0.05 to 2 mm.

In a seventeenth aspect, the disclosure provides the TPS system of any of the thirteenth through sixteenth aspects, in which the thermal conductivity of the surface layer of graphitized carbon ranges from 10 to 4000 W m$^{-1}$ K$^{-1}$.

In an eighteenth aspect, the disclosure provides the TPS system of any of the thirteenth through seventeenth aspects, in which the surface layer of graphitized carbon extends across at least 90% of the first face of the polymerized fiber reinforced composite.

In a nineteenth aspect, the disclosure provides the TPS system of any of the thirteenth through eighteenth aspects, in which electrically and thermally conductive traces in a defined pattern form the surface layer of graphitized carbon.

In a twentieth aspect, the disclosure provides the TPS system of any of the thirteenth through nineteenth aspects, in which the electrically and thermally conductive traces cover less than 50% of the area of the first face of the polymerized fiber reinforced composite.

In a twenty-first aspect, the disclosure provides the TPS system of any of the thirteenth through twentieth aspects, in which the electromagnetic radiation is applied at a power density of 0.05 W/mm$^2$ to 0.75 W/mm$^2$ and deliver a total energy density to the portion of the first face of 0.5 J/mm$^2$ to 2.5 J/mm$^2$.

In a twenty-second aspect, the disclosure provides a composite thermal protection system (TPS). The composite TPS comprising a bulk polymerized fiber reinforced composite comprising: a cured thermoset polymer matrix; and at least one reinforcement material; and a surface layer of graphitized carbon unified with the bulk polymerized fiber reinforced composite; wherein the bulk polymerized fiber reinforced composite and the surface layer of graphitized carbon form a monolith without an adhesive or fastener to secure the surface layer of graphitized carbon to the bulk polymerized fiber reinforced composite; wherein the surface layer of graphitized carbon comprises an electrical conductivity of 0.25 S m$^{-1}$ to 2.5 S m$^{-1}$; and wherein the surface layer of graphitized carbon comprises a thermal conductivity that is greater than a thermal conductivity of the bulk polymerized reinforced composite.

In a twenty-third aspect, the disclosure provides the TPS system of any of the thirteenth through twenty-second aspects, in which a thermal ablation rate of the composite TPS is greater than 10% less than a thermal ablation rate of the bulk polymerized fiber reinforced composite.

In a twenty-fourth aspect, the disclosure provides the TPS system of any of the thirteenth through twenty-third aspects, in which a measured temperature of a second side of the composite TPS is greater than 50% less than a measured temperature of a second side of a sample of the polymerized fiber reinforced composite having the same dimensions as the composite TPS after 60 second of thermally exposure to a front side of the composite TPS and a front side of the sample, wherein the front side of the composite TPS is opposite the backside of the composite TPS and the front side of the sample is opposite the backside of the sample.

In a twenty-fifth aspect, the disclosure provides the TPS system of any of the thirteenth through twenty-fourth aspects, in which the composite thermal protection system is applied to a hypersonic vehicle.

In a twenty-sixth aspect, the disclosure provides the TPS system of any of the thirteenth through twenty-fifth aspects, in which the composite thermal protection system is in a lightning strike protection, radar absorbing, deicing, or EMI shielding application.

It should be apparent to those skilled in the art that various modifications and variations may be made to the embodiments described within without departing from the spirit and scope of the claimed subject matter. Thus, it is intended that the specification cover the modifications and variations of the various embodiments described within provided such modification and variations come within the scope of the appended claims and their equivalents.

As used throughout, the singular forms "a," "an" and "the" include plural referents unless the context clearly dictates otherwise. Thus, for example, reference to "a" component includes aspects having two or more such components, unless the context clearly indicates otherwise.

It should be understood that any two quantitative values assigned to a property or measurement may constitute a range of that property or measurement, and all combinations of ranges formed from all stated quantitative values of a given property or measurement are contemplated in this disclosure.

As used here and in the appended claims, the words "comprise," "has," and "include" and all grammatical variations thereof are each intended to have an open, non-limiting meaning that does not exclude additional elements or steps.

Having described the subject matter of the present disclosure in detail and by reference to specific embodiments thereof, it is noted that the various details disclosed within should not be taken to imply that these details relate to elements that are essential components of the various embodiments described within, even in cases where a particular element is illustrated in each of the drawings that accompany the present description. Further, it should be apparent that modifications and variations are possible without departing from the scope of the present disclosure, including, but not limited to, embodiments defined in the appended claims. More specifically, although some aspects of the present disclosure are identified as particularly advantageous, it is contemplated that the present disclosure is not necessarily limited to these aspects.

What is claimed is:

1. A composite thermal protection system (TPS), the composite TPS comprising:
a surface layer of graphitized carbon formed from treating at least a portion of a first face of a polymerized fiber reinforced composite comprising a cured thermoset polymer matrix and at least one reinforcement material with electromagnetic radiation to raise the temperature of the portion of the first face to at least 800° C.,
wherein a thermoset polymer forming the cured thermoset polymer matrix comprises polymer represented by chemical formula (I) or (II) or (III)

FORMULA I

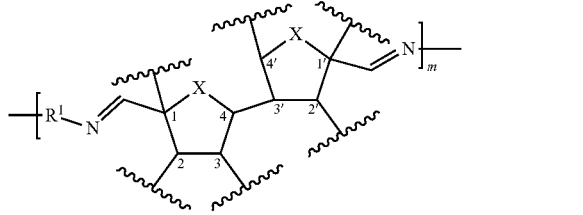

FORMULA II

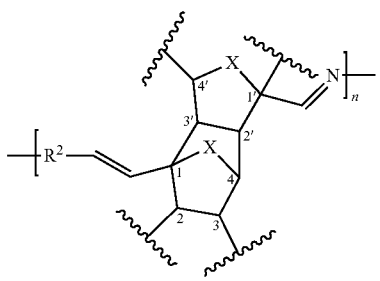

FORMULA III

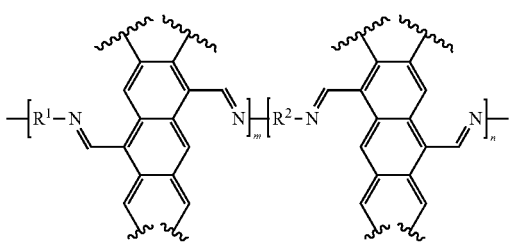

-continued

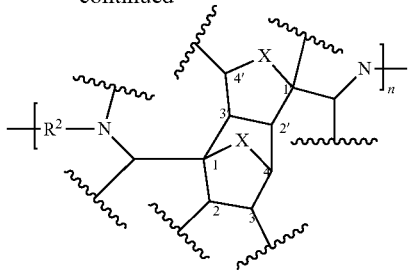

wherein:
m and n are each an integer greater than or equal to 1,
at least one of $R^1$ or $R^2$ comprises an aromatic moiety, and
X is selected from the group consisting of $CH_2$, NH, O, S, $SO_2$, and combinations thereof;
wherein formation of the surface layer of graphitized carbon directly from the polymerized fiber reinforced composite results in the surface layer of graphitized carbon being unified with a bulk polymerized fiber reinforced composite representing the polymerized fiber reinforced composite not treated with the electromagnetic radiation;
wherein the surface layer of graphitized carbon comprises an electrical conductivity of 0.25 S $m^{-1}$ to 2.5 S $m^{-1}$; and
wherein the surface layer of graphitized carbon comprises a thermal conductivity that is greater than a thermal conductivity of the bulk polymerized reinforced composite.

2. The composite TPS of claim 1, wherein the reinforcement material is carbon fiber or ceramic fiber.

3. The composite TPS of claim 1, wherein a thickness of the surface layer of graphitized carbon ranges from 0.05 to 2 mm.

4. The composite TPS of claim 1, wherein the thermal conductivity of the surface layer of graphitized carbon ranges from 10 to 4000 W $m^{-1}$ $K^{-1}$.

5. The composite TPS of claim 1, wherein the surface layer of graphitized carbon extends across at least 90% of the first face of the polymerized fiber reinforced composite.

6. The composite TPS of claim 1, wherein electrically and thermally conductive traces in a defined pattern form the surface layer of graphitized carbon.

7. The composite TPS of claim 6, wherein the electrically and thermally conductive traces cover less than 50% of the area of the first face of the polymerized fiber reinforced composite.

8. The composite TPS of claim 1, wherein the electromagnetic radiation is applied at a power density of 0.05 W/$mm^2$ to 0.75 W/$mm^2$ and deliver a total energy density to the portion of the first face of 0.5 J/$mm^2$ to 2.5 J/$mm^2$.

9. The composite TPS of claim 1, wherein the composite thermal protection system is applied to a hypersonic vehicle.

10. The composite TPS of claim 1, wherein the composite thermal protection system is in a lightning strike protection, radar absorbing, deicing, or EMI shielding application.

11. A composite thermal protection system (TPS), the composite TPS comprising:
a bulk polymerized fiber reinforced composite comprising:
a cured thermoset polymer matrix; and
at least one reinforcement material; and
a surface layer of graphitized carbon unified with the bulk polymerized fiber reinforced composite;
wherein a thermoset polymer forming the cured thermoset polymer matrix comprises comprises polymer represented by chemical formula (I) or (II) or (III)

FORMULA I

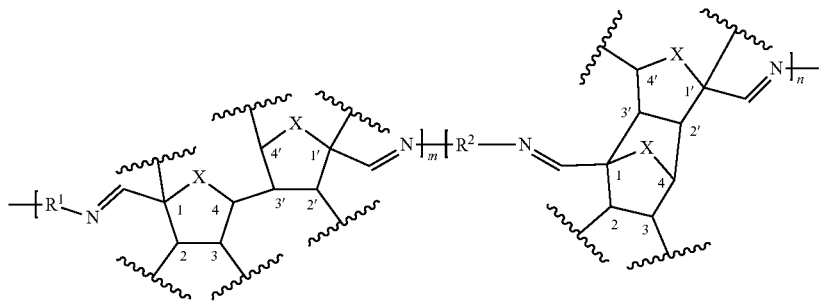

FORMUA II

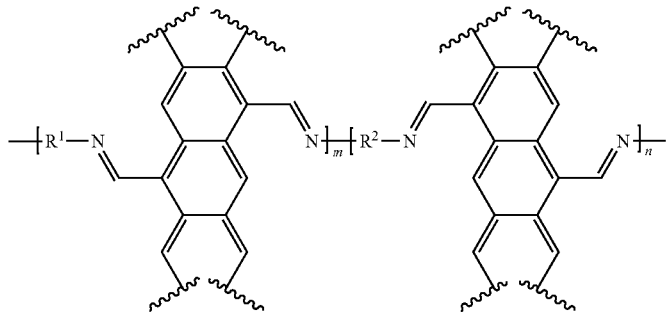

FORMULA III

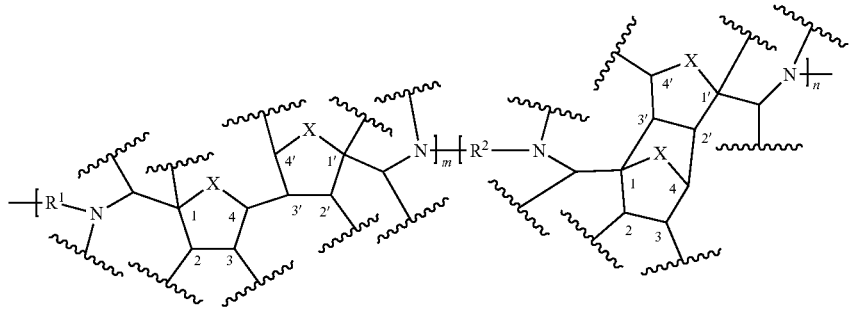

wherein;
  m and n are each an integer greater than or equal to 1,
  at least one of $R^1$ or $R^2$ comprises an aromatic moiety, and
  X is selected from the group consisting of $CH_2$, NH, O, S, $SO_2$, and combinations thereof;
  wherein the bulk polymerized fiber reinforced composite and the surface layer of graphitized carbon form a monolith without an adhesive or fastener to secure the surface layer of graphitized carbon to the bulk polymerized fiber reinforced composite;
  wherein the surface layer of graphitized carbon comprises an electrical conductivity of 0.25 S $m^{-1}$ to 2.5 S $m^{-1}$; and
  wherein the surface layer of graphitized carbon comprises a thermal conductivity that is greater than a thermal conductivity of the bulk polymerized reinforced composite.

* * * * *